(12) United States Patent
Wilenski et al.

(10) Patent No.: US 10,688,766 B2
(45) Date of Patent: Jun. 23, 2020

(54) FABRICATION OF COMPOSITE LAMINATES HAVING THIN INTERLAYERS

(71) Applicant: The Boeing Company, Chicago, IL (US)

(72) Inventors: Mark Stewart Wilenski, Mercer Island, WA (US); Kelsi Marie Hurley, Kent, WA (US)

(73) Assignee: The Boeing Company, Chicago, IL (US)

( * ) Notice: Subject to any disclaimer, the term of this patent is extended or adjusted under 35 U.S.C. 154(b) by 1075 days.

(21) Appl. No.: 14/553,568

(22) Filed: Nov. 25, 2014

(65) Prior Publication Data

US 2016/0257104 A1   Sep. 8, 2016

(51) Int. Cl.
*B32B 37/14*   (2006.01)
*B32B 5/02*   (2006.01)
(Continued)

(52) U.S. Cl.
CPC .............. *B32B 37/144* (2013.01); *B32B 5/00* (2013.01); *B32B 5/02* (2013.01); *B32B 5/022* (2013.01); *B32B 5/10* (2013.01); *B32B 5/12* (2013.01); *B32B 5/14* (2013.01); *B32B 5/22* (2013.01); *B32B 5/24* (2013.01); *B32B 5/26* (2013.01); *B32B 7/00* (2013.01); *B32B 7/02* (2013.01); *B32B 7/04* (2013.01); *B32B 7/08* (2013.01); *B32B 7/10* (2013.01); *B32B 7/12* (2013.01); *B32B 7/14* (2013.01); *B32B 27/00* (2013.01); *B32B 27/06* (2013.01); *B32B 27/08* (2013.01); *B32B 27/12* (2013.01); *B32B 27/26* (2013.01);
(Continued)

(58) Field of Classification Search
None
See application file for complete search history.

(56) References Cited

U.S. PATENT DOCUMENTS 4,595,629 A * 6/1986 Mays ..................... A41D 13/11
                                                            428/483
4,892,774 A * 1/1990 Vallance ................. B32B 27/12
                                                            428/174
(Continued)

FOREIGN PATENT DOCUMENTS

CN       103302927 A    9/2013
EP         1291167 A1    3/2003
(Continued)

OTHER PUBLICATIONS

Search Report for related European Application No. EP15194141; report dated Mar. 16, 2016.
(Continued)

*Primary Examiner* — Matthew J Daniels
*Assistant Examiner* — Mohammad M Ameen
(74) *Attorney, Agent, or Firm* — Miller, Matthias & Hull LLP

(57) ABSTRACT

A method of fabricating a composite laminate comprises forming a stack including first and second fiber beds and an interlayer between the fiber beds. The fiber beds are impregnated with matrix resin. The interlayer includes a soluble thermoplastic component on an insoluble component. The method further comprises dissolving the soluble thermoplastic component into the matrix resin to reduce thickness of the interlayer.

20 Claims, 8 Drawing Sheets

(51) Int. Cl.
*B32B 27/12* (2006.01)
*B32B 27/26* (2006.01)
*B32B 7/02* (2019.01)
*B32B 7/08* (2019.01)
*B32B 27/28* (2006.01)
*B32B 5/22* (2006.01)
*B32B 7/00* (2019.01)
*B32B 7/12* (2006.01)
*B32B 5/00* (2006.01)
*B32B 27/38* (2006.01)
*B32B 5/24* (2006.01)
*B32B 27/00* (2006.01)
*B32B 7/10* (2006.01)
*B32B 5/14* (2006.01)
*B32B 5/26* (2006.01)
*B32B 7/14* (2006.01)
*B32B 5/10* (2006.01)
*B32B 7/04* (2019.01)
*B32B 27/08* (2006.01)
*B32B 5/12* (2006.01)
*B32B 27/06* (2006.01)
*B32B 38/10* (2006.01)

(52) U.S. Cl.
CPC .............. *B32B 27/28* (2013.01); *B32B 27/38* (2013.01); *B32B 38/10* (2013.01); *B32B 2250/00* (2013.01); *B32B 2250/40* (2013.01); *B32B 2264/00* (2013.01); *B32B 2264/02* (2013.01); *B32B 2264/0221* (2013.01); *B32B 2307/50* (2013.01); *B32B 2307/552* (2013.01); *B32B 2307/558* (2013.01); *B32B 2605/00* (2013.01); *B32B 2605/18* (2013.01)

(56) References Cited

U.S. PATENT DOCUMENTS

| | | | |
|---|---|---|---|
| 5,085,928 A * | 2/1992 | Krueger | B29C 70/083 428/474.4 |
| 5,141,804 A * | 8/1992 | Riefler | B29C 70/086 156/292 |
| 8,470,923 B2 | 6/2013 | Boyle et al. | |
| 8,517,300 B2 | 8/2013 | Simmons et al. | |
| 8,686,069 B2 | 4/2014 | Wang | |
| 8,796,164 B2 | 8/2014 | Restuccia et al. | |
| 2003/0180514 A1 | 9/2003 | Baudonnel | |
| 2005/0059309 A1 * | 3/2005 | Tsotsis | B29B 11/16 442/381 |
| 2006/0252334 A1 * | 11/2006 | LoFaro | B32B 5/022 442/400 |
| 2010/0086764 A1 * | 4/2010 | Pepka | B29C 70/081 428/221 |
| 2012/0156422 A1 | 1/2012 | Kozar et al. | |
| 2012/0029118 A1 | 2/2012 | Gammon et al. | |
| 2012/0108132 A1 | 5/2012 | Fang et al. | |

FOREIGN PATENT DOCUMENTS

| | | |
|---|---|---|
| GB | 2113140 A | 8/1983 |
| JP | 2001354916 A | 12/2001 |
| JP | 2010042841 A | 2/2010 |
| WO | 2013093053 A2 | 6/2013 |

OTHER PUBLICATIONS

Office Action for related Chinese Application No. 2015108316365; report dated Apr. 2, 2019.
Search Report for related Chinese Application No. 2015108316365; report dated Aug. 27, 2019.
Office Action for related Japanese Application No. 2015-162671; report dated Mar. 2, 2020.

* cited by examiner

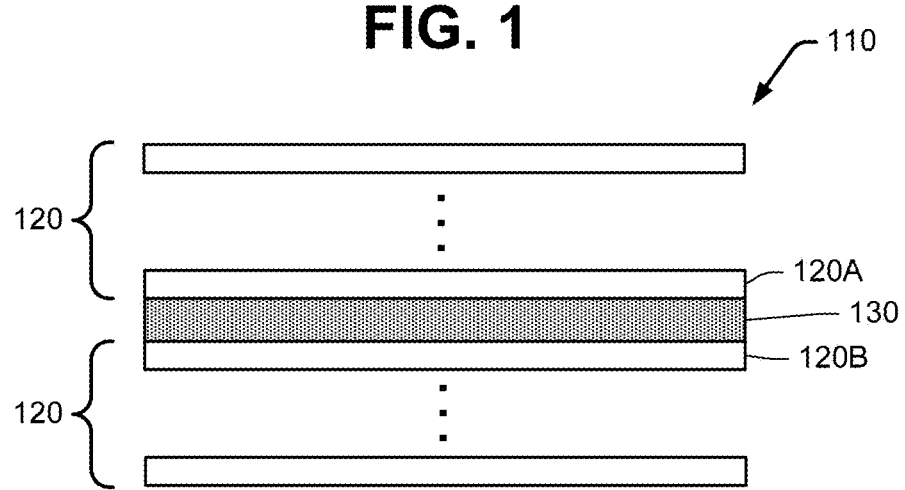
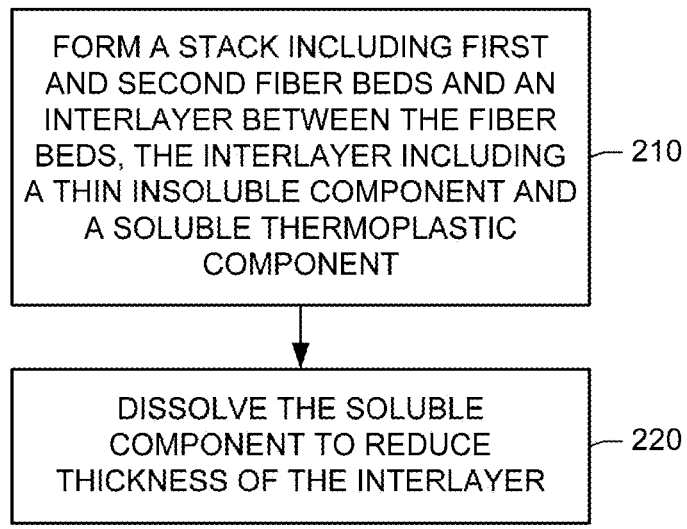

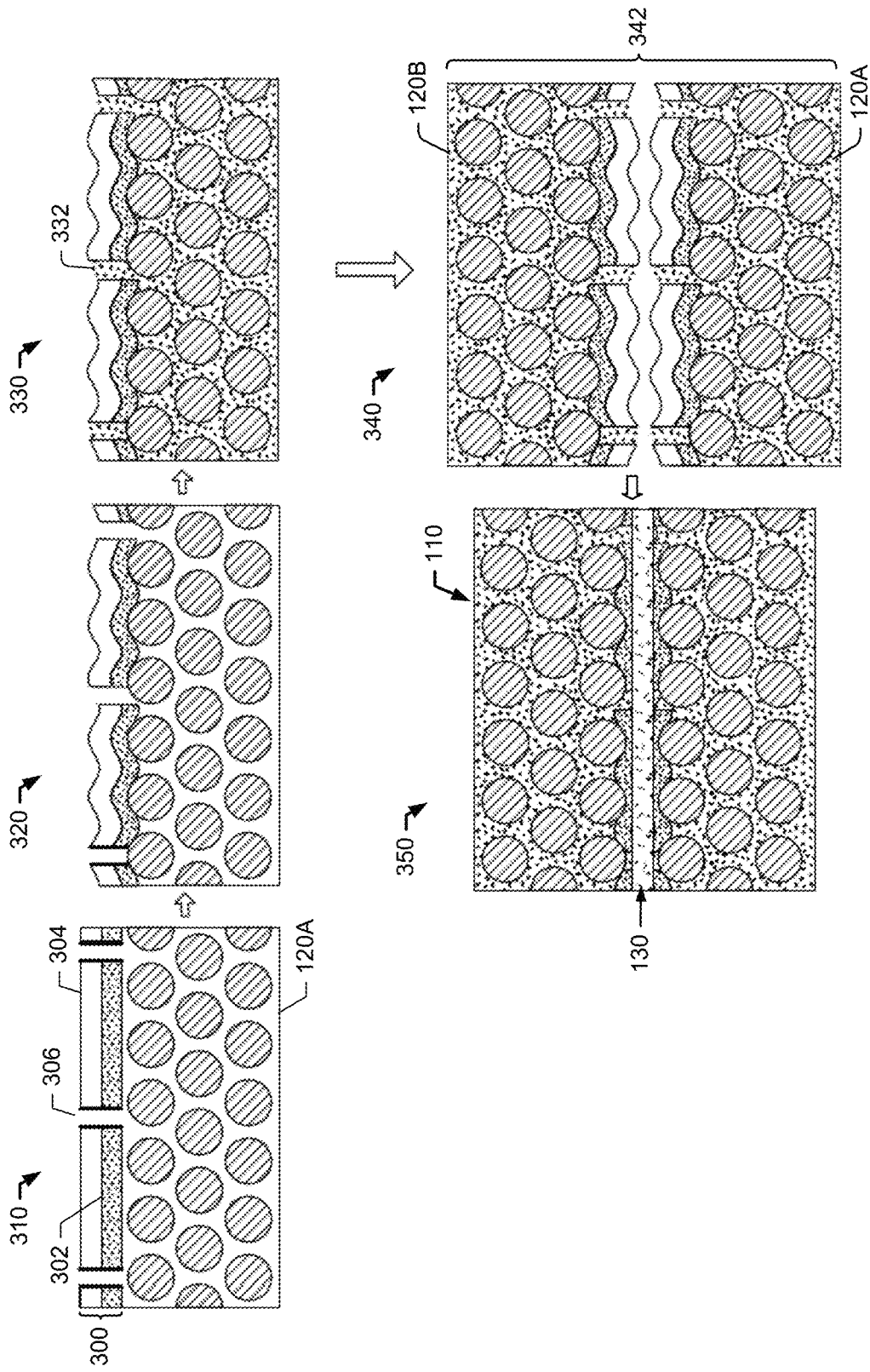

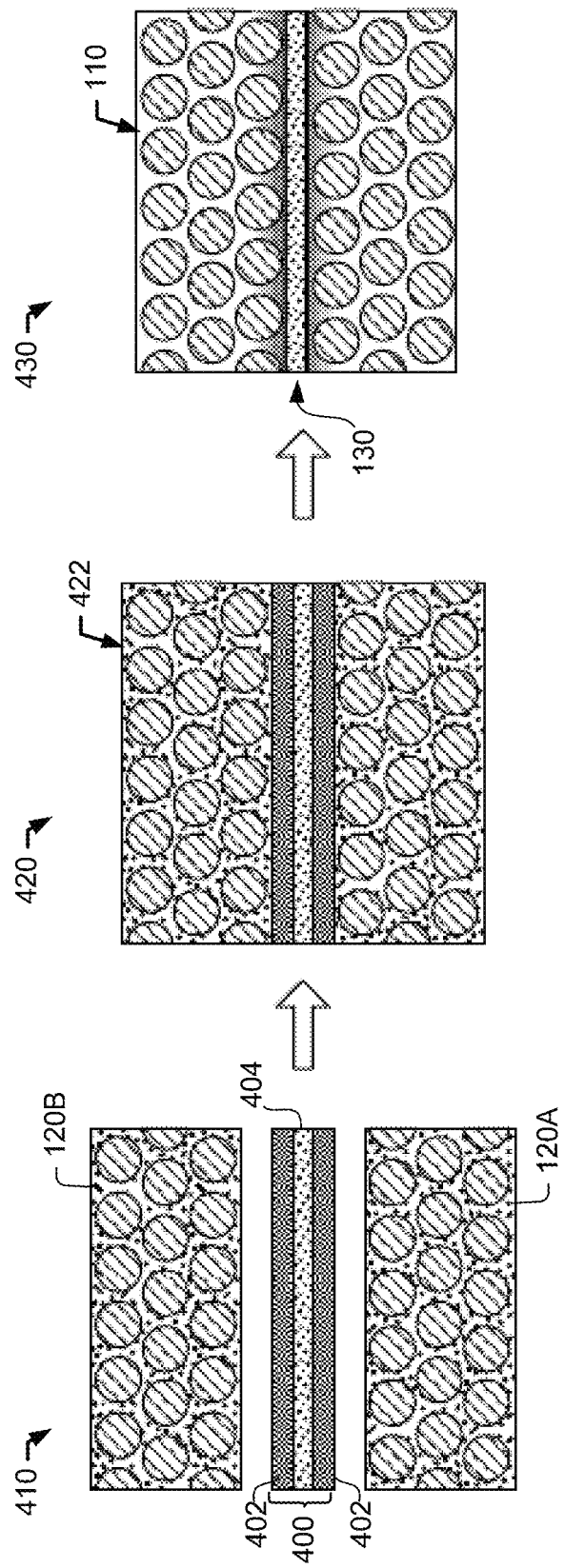

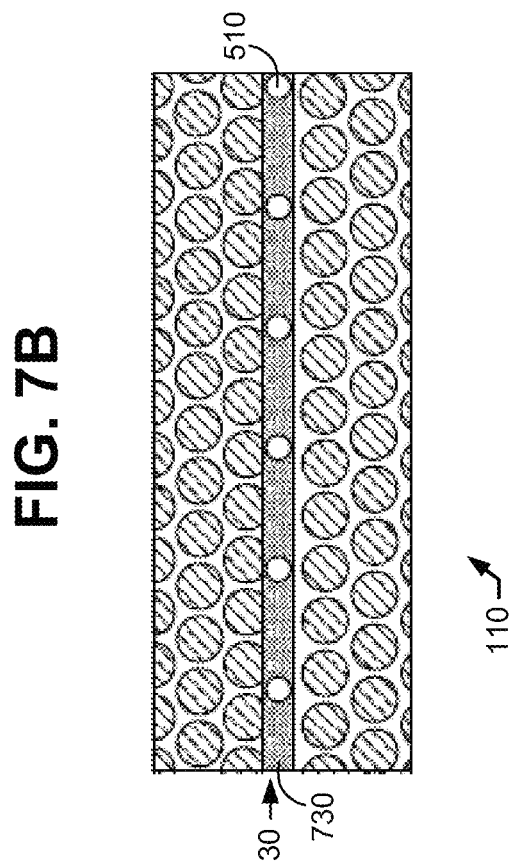
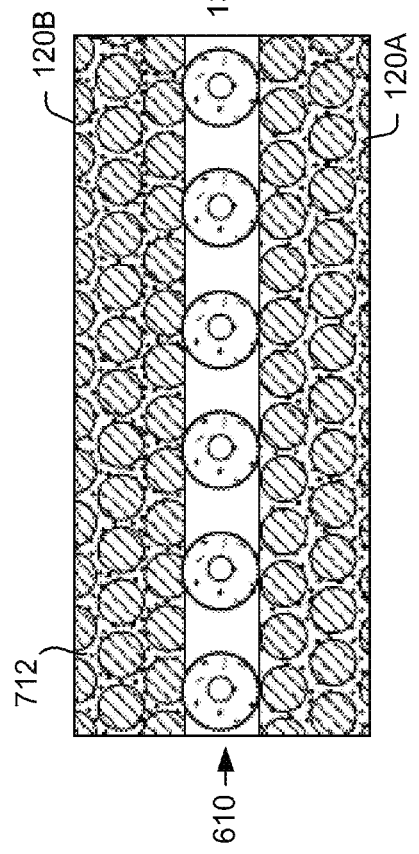

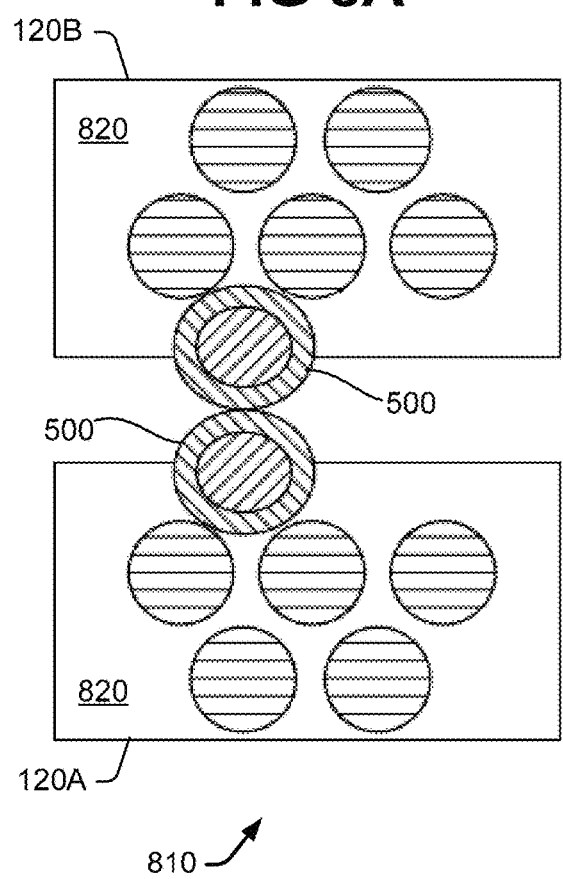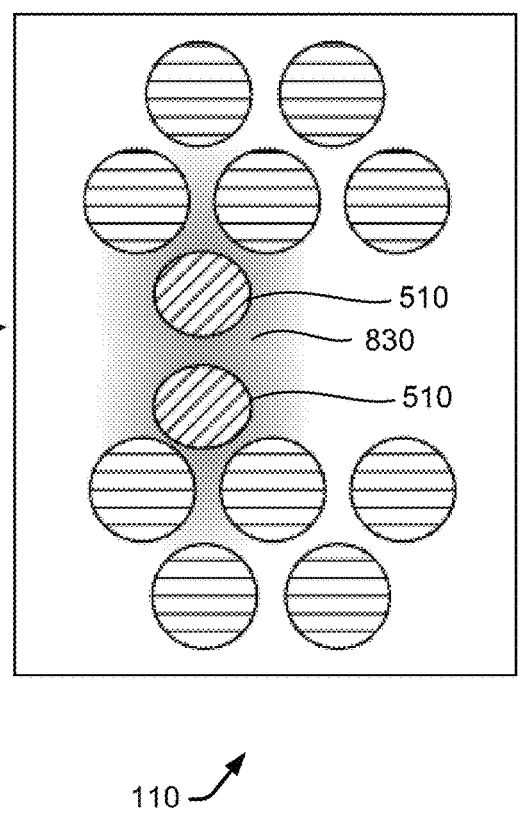

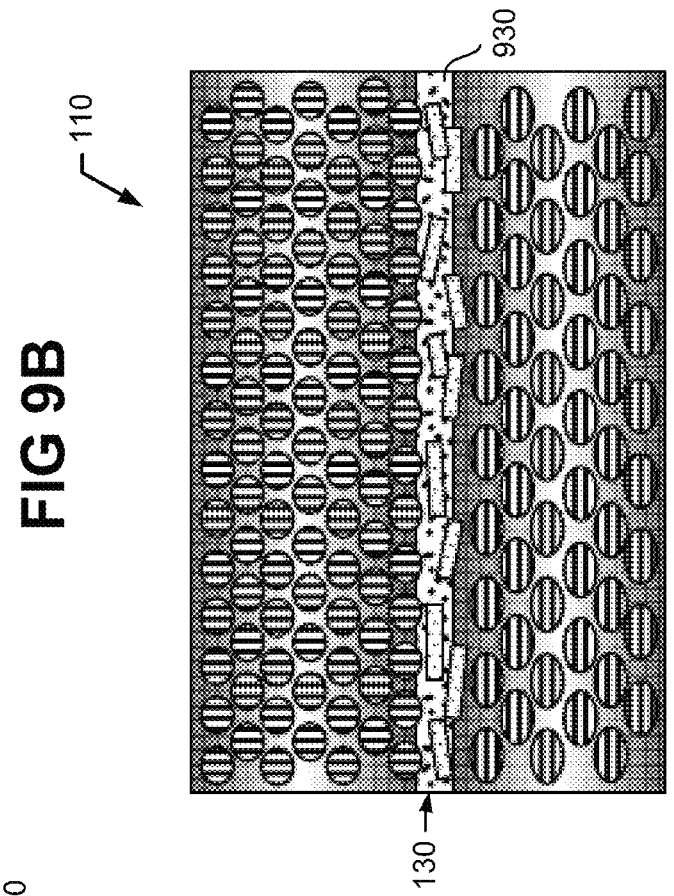
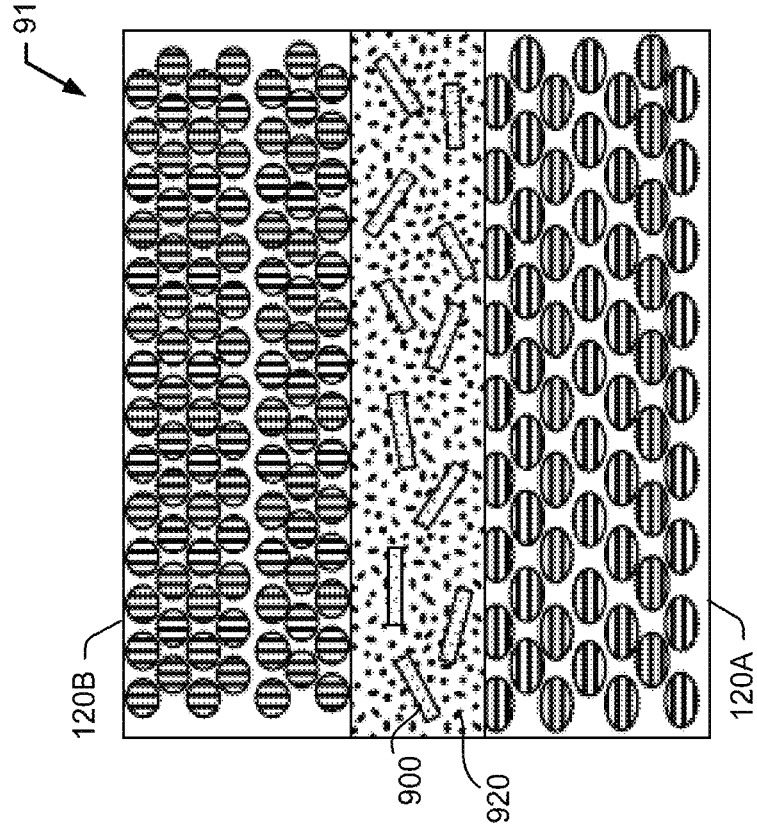

FABRICATION OF COMPOSITE LAMINATES HAVING THIN INTERLAYERS

BACKGROUND

An impact to a composite laminate can cause cracks to initiate and propagate in or between fiber beds of the laminate. Interlayers between the fiber beds may be used to impede or stop the propagation of the cracks. For instance, the interlayers may include thermoplastic spheres or resin with a high thermoplastic content.

However, the interlayers can increase thickness of the composite laminate. The increase in thickness may be substantial and undesirable.

SUMMARY

According to an embodiment herein, a method of fabricating a composite laminate comprises forming a stack including first and second fiber beds and an interlayer between the fiber beds. The fiber beds are impregnated with matrix resin. The interlayer includes a soluble thermoplastic component on an insoluble component. The method further comprises dissolving the soluble thermoplastic component into the matrix resin to reduce thickness of the interlayer.

According to another embodiment herein, an article for fabricating a composite laminate comprises an insoluble film having a thickness between 2 and 20 microns, and at least one soluble thermoplastic film bonded to the insoluble film. The at least one soluble thermoplastic film increases thickness of the article.

According to another embodiment herein, an article for fabricating a composite laminate comprises a veil of insoluble discontinuous filaments having soluble thermoplastic coatings.

These features and functions may be achieved independently in various embodiments or may be combined in other embodiments. Further details of the embodiments can be seen with reference to the following description and drawings.

BRIEF DESCRIPTION OF THE DRAWINGS

FIG. 1 is an illustration of a composite laminate including first and second fiber beds, and an interlayer between the fiber beds.

FIG. 2 is an illustration of a general method of fabricating a composite laminate including a thin interlayer having toughened regions.

FIG. 3 is an illustration of a method of fabricating a composite laminate including an interlayer from soluble thermoplastic films and insoluble films.

FIG. 4 is an illustration of a method of fabricating a composite laminate including an interlayer from soluble thermoplastic films and an insoluble film.

FIGS. 7A and 7B are illustrations of a method of fabricating a composite laminate including an interlayer from a veil of insoluble filaments coated with soluble thermoplastic.

FIGS. 8A and 8B are illustrations of a method of fabricating a composite laminate including an interlayer from continuous insoluble filaments coated with soluble thermoplastic.

FIGS. 9A and 9B are illustrations of a method of fabricating a composite laminate including an interlayer from insoluble particles or discontinuous filaments dispersed in a soluble thermoplastic film.

DETAILED DESCRIPTION

Figure 5:
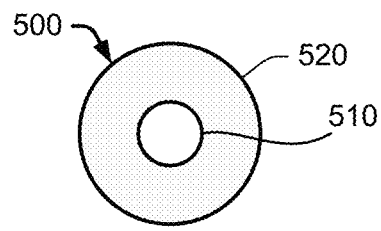
FIG. 5 is an illustration of an insoluble filament or particle with a soluble thermoplastic coating.

Referring to FIG. 1, a composite laminate 110 includes a plurality of fiber beds 120. A fiber bed 120 contains one or more rows of fibrous media. As a first example, a fiber bed 120 includes one or more rows of continuous unidirectional reinforcing fibers. As a second example, a fiber bed 120 includes a weave of continuous reinforcing fibers having different orientations. As a third example, a fiber bed 120 includes a random mat, whose reinforcing fibers are discontinuous, randomly oriented, and overlapping.

In some configurations, all reinforcing fibers in all of the fiber beds 120 extend in the same direction. In other configurations, the reinforcing fibers of some fiber beds 120 extend in different directions than the reinforcing fibers of other fiber beds 120. For example, the composite laminate 110 may include one or more fiber beds 120 having fibers oriented at zero degrees with respect to a reference direction, and one or more fiber beds 120 having fibers oriented at a non-zero degree angle (e.g., 45 degrees, 90 degrees) with respect to the reference direction.

Different fiber beds 120 of the composite laminate 110 may have the same types of fibers or different types of fibers. Fiber types may differ by size, modulus, composition, etc.

The reinforcing fibers are embedded in a matrix. Different fiber beds 120 may have the same matrix composition or different matrix compositions.

The composite laminate 110 further includes at least one interlayer 130 (although only one interlayer 130 is illustrated, the composite laminate 110 may include at least one additional interlayer 130). An interlayer 130 is located between two adjacent fiber beds 120, which will be referred to as first and second fiber beds 120A and 120B.

The interlayer 130 is thin. Whereas a conventional interlayer may have a thickness of about 25 microns, the interlayer 130 has a thickness between 2 and 20 microns and more preferably between 3 and 8 microns.

Reference is now made to FIG. 2, which illustrates a method of fabricating a composite laminate including a thin interlayer. At block 210, a stack is formed. The stack includes first and second fiber beds and an interlayer between the first and second fiber beds. The first and second fiber beds may be pre-impregnated with matrix resin prior to forming the stack, or the stack may be formed with dry fiber beds that are thereafter impregnated with matrix resin.

The interlayer includes a soluble thermoplastic component and an insoluble component. The insoluble component is thin, having a thickness between 2 and 20 microns and more preferably between 3 and 8 microns.

At block 220, the soluble thermoplastic component is dissolved into the matrix resin to reduce thickness of the interlayer. The soluble component may be partially soluble or completely soluble. The soluble component may be dissolved into the matrix resin during curing, or it may be dissolved with or without heating during a separate step.

The matrix resin may be "thermoplastic-starved." That is, the amount of thermoplastic component in the matrix resin and thus total matrix resin present in the fiber beds prior to cure is less than what is desired in the final part. When the soluble component is dissolved into the thermoplastic-starved matrix resin, the thermoplastic content in the fiber bed is increased to the desired amount. Thus, the extra matrix resin comes from the dissolved soluble component.

The insoluble component does not dissolve at block 220. The insoluble component establishes a minimum post-cure thickness of the interlayer.

In some embodiments, the soluble component is dissolved entirely, leaving only the insoluble component. In other embodiments, the soluble thermoplastic component is dissolved partially, whereby the remaining insoluble component is surrounded by reduced thermoplastic concentration.

The insoluble component alone is too thin to survive processing (e.g., web handling) during manufacture of the composite laminate. The soluble thermoplastic component adds to the overall thickness of the interlayer so the interlayer can survive the processing.

The following paragraphs describe several examples of fabricating a composite laminate.

FIG. 3 illustrates a first example. In the example of FIG. 3, the insoluble component includes first and second insoluble films 302, and the soluble component includes first and second soluble thermoplastic films 304. The first insoluble film 302 is bonded to the first soluble thermoplastic film 304 to form a first bi-component film 300, and the second insoluble film 302 is bonded to the second soluble thermoplastic film 304 to form a second bi-component film 300. The soluble film 304 adds to the overall thickness of the bi-component film 300 so the bi-component film 300 can survive processing (whereas the insoluble film 302 alone would be too thin to survive processing). The two films 302 and 304 of each bi-component film 300 may have through-holes 306 that are aligned.

At block 310, the first bi-component film 300 is placed on the first fiber bed 120A. The insoluble film 302 is in contact with the first fiber bed 120A.

At block 320, if the insoluble film 302 is made of thermoplastic material, the insoluble film 302 is fused to the first fiber bed 120A. Heat and pressure may be applied by a heated nip roller or other source. Heat without pressure may be applied by an infrared heater or other source. The fusing causes the insoluble film 302 to be chemically bonded to, or mechanically interlocked with, reinforcing fibers of the first fiber bed 120A. The bonding may be covalent or non-covalent (e.g., hydrogen bonding). The mechanical interlocking may occur when the insoluble film 302 is softened and infiltrates the first fiber bed 120A and moves around the reinforcing fibers.

At block 330, the first fiber bed 120A is impregnated with matrix resin 332. The matrix resin 332 may be placed on the soluble film 304 and forced into the through-holes 306 and into the first fiber bed 120A. The matrix resin 332 may be thermoplastic-starved.

Blocks 310-330 are repeated for the second fiber bed 120B, wherein the second bi-component film 300 is placed on the second fiber bed 120B, the insoluble film 302 may be fused to the second fiber bed 120B, and the second fiber bed 120B is impregnated with matrix resin 332.

At block 340, an uncured stack 342 is formed. The first and second fiber beds 120A and 120B are stacked up with their soluble films 304 in contact. Additional fiber beds (not shown) may be added to the stack 342. At this stage, the stack 342 is ready for curing.

At block 350, the stack is cured to produce a composite laminate 110. During curing, the soluble films 304 are dissolved, whereby the thermoplastic from the soluble films 304 blends with the matrix resin 332. If the soluble films 304 are dissolved entirely, only the insoluble films 302 remain, resulting in very a thin interlayer. If the soluble films 304 are dissolved partially, the soluble films 304 create a region of thermoplastic content between the insoluble films 302. If the insoluble films 302 are made of thermoplastic material, the region between the insoluble films 302 has a lower thermoplastic content.

Thus, minimum thickness of the interlayer 130 is determined by thickness of the insoluble films 302. Actual thickness of the interlayer 130 is affected by dissolving the soluble films 304. The more that the soluble film 304 is dissolved, the thinner the interlayer 130 will be.

The fusing at block 320 is optional even if the insoluble film 302 is made of thermoplastic material. That is, the method of FIG. 3 may produce a composite laminate 110 having a thermoplastic interlayer 130 that is not fused to the first and second fiber beds 120A and 120B.

Reference is made to FIG. 4, which illustrates a second (alternative) example, in which the interlayer is formed by a tri-component film 400. The tri-component film 400 includes soluble thermoplastic films 402 located on both sides of an insoluble film 404. A stack 422 is formed from pre-impregnated first and second fiber beds 120A and 120B and a tri-component film 400 there between (blocks 410 and 420). Stack formation is simplified because the resin impregnation at block 330 is omitted. In addition, there is no need to identify the correct side of the tri-component film 400 to place on the first fiber bed 120A, since both sides of the tri-component film 400 are identical. The stack formation is further simplified because the fusing at block 320 is omitted.

The stack 422 is cured to produce a composite laminate 110 (block 430). The soluble films 402 are dissolved into the matrix resin (represented by the shaded regions). Minimum thickness of the interlayer 130 is determined by thickness of the insoluble film 404.

A variation of the first and second examples involves a single bi-component film between the first and second fiber beds 120A and 120B. The soluble component of the bi-component film may be in contact with the second fiber bed 120B, which is thermoplastic-starved.

Reference is made to FIG. 5. The interlayer 130 may be formed from coated filaments 500 instead of insoluble films. A coated filament 500 includes an insoluble filament 510 having a soluble thermoplastic coating 520.

The coated filaments 500 may be unidirectional or they may be overlapping. A first example of overlapping filaments is a weave. The coated filaments 500 in a weave may be continuous. A second example of overlapping filaments 510 is a veil.

Figure 6:
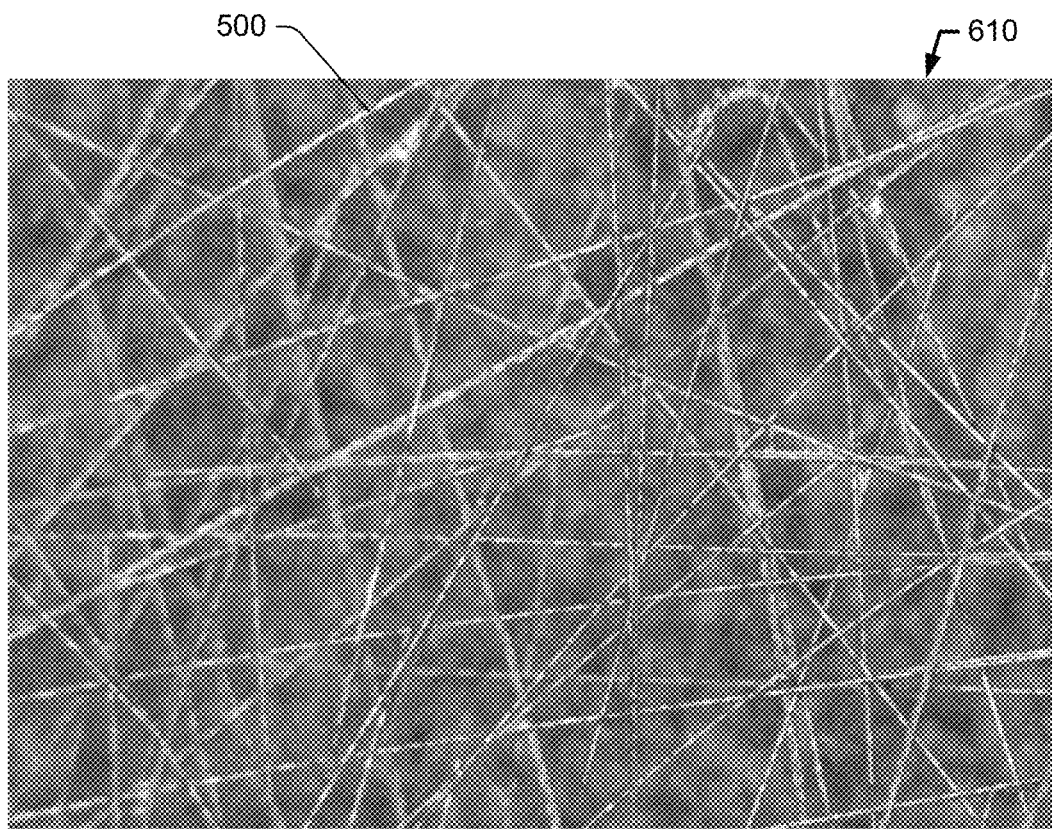
FIG. 6 is a photograph of a veil.

FIG. 6 is a photograph of a veil 610. The veil 610 includes short chopped coated filaments 500, which may be bound together into a lightweight non woven mat during a wet papermaking process.

Reference is made to FIGS. 7A and 7B, which illustrate a third example. In this third example, the interlayer 130 is formed from a veil 610 having coated filaments 500.

FIG. 7A illustrates a stack 710 prior to cure. The stack 710 includes the veil 610 between first and second fiber beds 120A and 120B. The first and second fiber beds 120A and 120B are impregnated with matrix resin 712. The stack 710 is cured to produce a composite laminate 110. As the stack 710 is being cured, the thermoplastic from the soluble thermoplastic coating 520 is dissolved into the matrix resin 712. Areal weight of the veil 610, length and diameter of the coated filaments 500, and diameters of the insoluble filaments 510 all play a role in setting the minimum thickness of the interlayer 130.

The insoluble filaments 510 may be made of thermoplastic, and the matrix resin 712 may be a thermoset. In this configuration, the region 730 surrounding the insoluble filaments 510 has a lower thermoplastic content than the insoluble filaments 510.

Reference is made to FIGS. 8A and 8B, which illustrate a fourth example. In this fourth example, the interlayer 130 is formed from coated filaments 500. The coated filaments 500 may be continuous or in the form of a veil.

FIG. 8A illustrates a stack 810 prior to cure. The stack 810 includes first and second fiber beds 120A and 120B impregnated with matrix resin 820. A first plurality of coated filaments 500 are deposited on a surface of the first fiber bed 120A, and a second plurality of coated filaments 500 are deposited on a surface of the second fiber bed 120B. The stack 810 is cured to produce a composite laminate 110. As the stack 810 is being cured, the soluble thermoplastic coatings 520 dissolve into the matrix resin 820.

FIG. 8B illustrates the composite laminate 110. If the insoluble filaments 510 are thermoplastic and the matrix resin is a thermoset, the region 830 surrounding the thermoplastic filaments 510 will have a mixture of thermoset and thermoplastic.

The fourth example is not limited to coated filaments 500. Coated particles (that is, insoluble particles coated with soluble thermoplastic material) may be used instead of coated filaments 500.

Reference is made to FIGS. 9A and 9B, which illustrate a fifth example. In this fifth example, the interlayer 130 may be formed from insoluble particles 900 or insoluble filaments 900 that are discontinuous, or from both insoluble particles 900 and discontinuous insoluble filaments 900.

FIG. 9A illustrates a stack 910 prior to cure. The stack 910 includes first and second fiber beds 120A and 120B that are impregnated with matrix resin. Between the fiber beds 120A and 120B are insoluble particles 900 and discontinuous filaments 900, which are dispersed in a soluble thermoplastic film 920. The stack 910 is cured to produce a composite laminate 110. As the stack 910 is being cured, the soluble thermoplastic film 920 dissolves into the matrix resin.

FIG. 9B illustrates the composite laminate 110. What remains after cure is a well ordered arrangement of insoluble particles and filaments 900 embedded in a matrix 930. If the matrix resin is a thermoset, the matrix 930 surrounding the insoluble particles and filaments 900 will have a mixture of thermoset and thermoplastic.

In the examples above, the filaments and particles have a relatively circular cross-section. However, the filaments and particles are not limited to any particular cross-sectional shape.

In the examples above, the fiber beds are impregnated with matrix resin prior to forming a stack. However, a method herein is not so limited. For instance, a stack may be formed with dry fiber beds and soluble and insoluble interlayer components, and the fiber beds in the stack may be infused with resin. For instance, a resin infusion process such as Vacuum Assisted Resin Transfer Molding (VARTM) or Controlled Atmospheric Pressure Resin Infusion (CAPRI) may be used to infuse resin into the fiber beds, while minimizing the interlayer thickness in the final part (the composite laminate). As the soluble component is dissolved, the thickness of the composite laminate may be reduced by migrating resin from the stack.

Although the interlayer may be a relatively planar structure between two fiber beds, a composite laminate herein is not so limited. For instance, the interlayer may be corrugated, whereby portions of the interlayer extend into the first and second fiber beds.

The insoluble component of the interlayer is not limited to any particular application. As a first example, the insoluble component may be configured to impart conductivity (in specific directions, or in general), creating an electrical circuit, providing electrical shielding, providing directional (or general) thermal conductivity, etc. For this first example, the insoluble component may include filaments or films made of carbon or graphene (e.g., carbon nanotubes, a graphene film).

As a second example, the insoluble component may include glass filaments. The glass filaments may add considerable toughness to the interlayer. Toughness is a measure of the energy that can be absorbed in resistance to crack propagation. Toughness may be characterized by the GI and GII properties. The glass filaments can impede or stop crack growth in the composite laminate.

As a third example, the insoluble component may include particles, filaments or films made of insoluble thermoplastic material, which form toughened regions. The toughened regions are characterized as "toughened" because they are made of a material that is more resistant to crack propagation than the matrix.

In this third example, the toughened regions may be tailored. Toughened regions formed by films may be tailored according to thickness and composition of the insoluble films and solubility of the soluble films. Toughened regions formed by filaments and particles may be tailored according to spatial density of the toughened regions (the spatial density refers to the number of particles or filaments per unit area) and/or different compositions for the toughened regions.

An interlayer may be patterned to provide different levels of toughness. Consider the example in FIG. 10, which illustrates one of many possible patterns for an interlayer 130: a checkerboard pattern. For the interlayer 130 of FIG. 10, the darker portions 1010 represent a high density of toughened regions, and the lighter portions 1020 represent a low density of toughened regions. The darker portions 1010 provide maximum toughness while the lighter portions 1020 provide less toughness.

Figure 10:
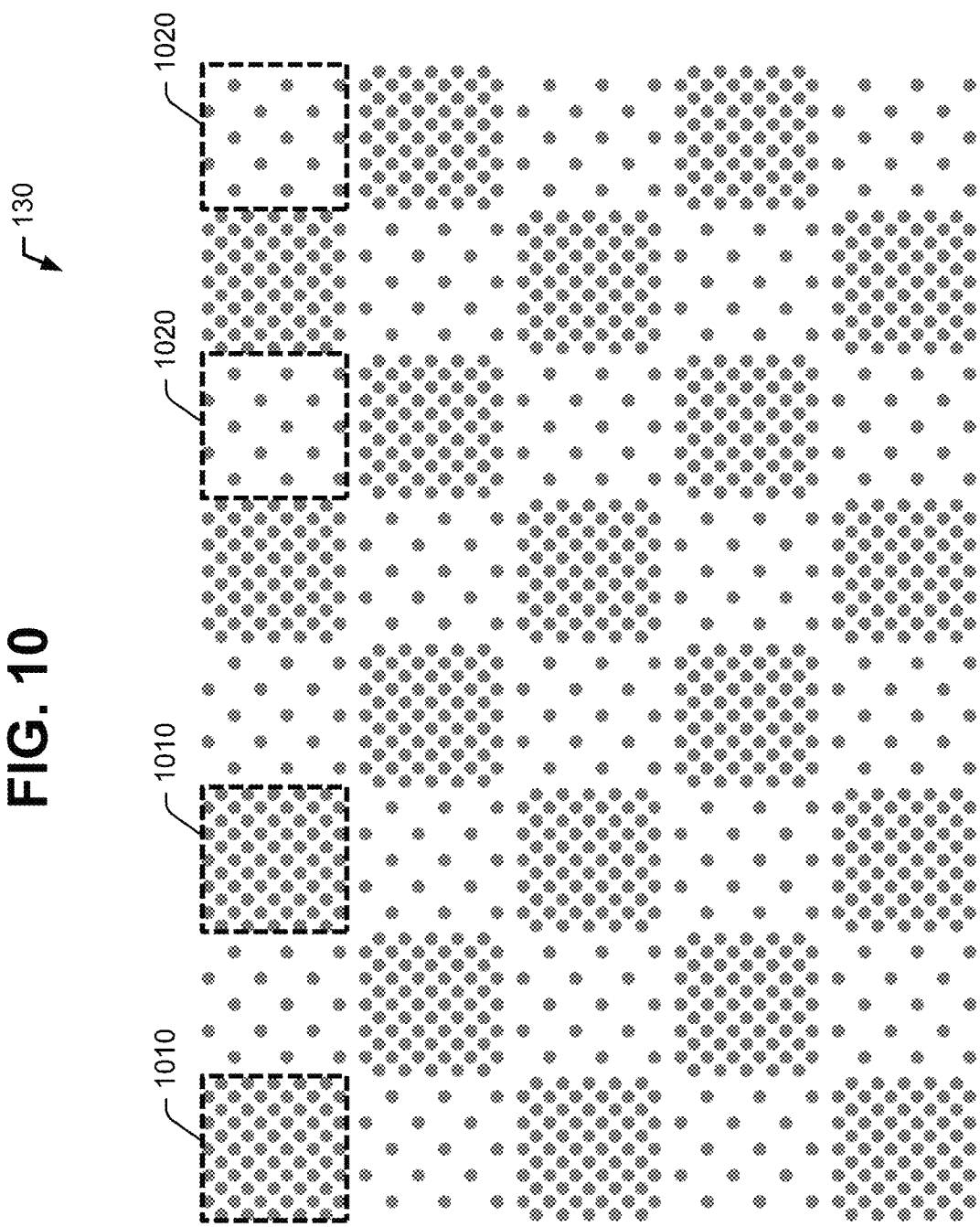
FIG. 10 is an illustration of a composite laminate having interlayers patterned for selective toughness.

FIG. 10 shows the portions 1010 and 1020 having rectangular shapes. Other shapes include, but are not limited to squares, diamonds, circles, and rectangles.

FIG. 10 shows roughly fifty percent of the darker (higher density) portions 1010, and fifty percent of the lighter (lower density) portions 1020. However, the pattern is not limited to two distinct densities in equal proportions. Other patterns may have different relative percentages of the densities. Other patterns may have more than two distinct densities. Other patterns may provide progressive levels of densities.

Different toughened regions may be made of different compositions by using different materials for the soluble coatings. The different soluble coatings may have different inherent toughness values. An interlayer portion having higher toughness may be formed by using a higher density of filaments or particles having tougher soluble coatings.

Some patterns may have portions that are also tailored according to modulus and/or strength. For example, an interlayer may include a pattern of high strength portions, lower strength, and high toughness portions.

In some patterns, portions may be embedded within other portions. For instance, a high toughness portion may be surrounded by a high strength portion, which may be adjacent a lower strength portion.

The invention claimed is:

1. A method of fabricating a composite laminate, comprising:

forming a stack including first and second fiber beds and an interlayer between the fiber beds, the interlayer including an insoluble thermoplastic component having a coating thereon, the coating being a soluble thermoplastic component, the insoluble thermoplastic component being insoluble in a matrix resin of the first and second fiber beds, the soluble thermoplastic component being soluble in the matrix resin of the first and second fiber beds, a first insoluble film and a first soluble thermoplastic film being deposited as a first bi-component film on the first fiber bed, a second insoluble film and a second soluble thermoplastic film being deposited as a second bi-component film on the second fiber bed, the first bi-component film including first through-holes that penetrate through the first insoluble film and the first soluble thermoplastic film, and the second bi-component film including second through-holes that penetrate through the second insoluble film and the second soluble thermoplastic film;

impregnating the first and second fiber beds with the matrix resin via the first and second through-holes in the first and second bi-component films prior to forming the stack; and dissolving the soluble thermoplastic component into the matrix resin of the first and second fiber beds to reduce a thickness of the interlayer.

2. The method of claim 1, wherein the thickness of the interlayer is between 2 and 20 microns after dissolving the soluble thermoplastic component.

3. The method of claim 1, wherein the thickness of the interlayer is between 3 and 8 microns after dissolving the soluble thermoplastic component.

4. The method of claim 1, wherein the matrix resin is thermoplastic-starved; and wherein the soluble thermoplastic component is dissolved into the thermoplastic-starved matrix resin.

5. The method of claim 1, wherein the soluble thermoplastic component is mixed with the matrix resin in a region adjacent the insoluble component.

6. The method of claim 1, wherein the insoluble component includes first and second insoluble films, and the soluble thermoplastic component includes first and second soluble thermoplastic films; and wherein forming the stack includes depositing the first insoluble and soluble films on the first fiber bed such that the first insoluble film is in contact with the first fiber bed, depositing the second insoluble and soluble films on the second fiber bed such that the second insoluble film is in contact with the second fiber bed, and forming an uncured stack by stacking the first and second fiber beds such that the first and second soluble thermoplastic films are in contact with each other.

7. The method of claim 6, wherein the first insoluble and soluble films are deposited as the first bi-component film on the first fiber bed, and the second insoluble and soluble films are deposited as the second bi-component film on the second fiber bed.

8. The method of claim 1, wherein the insoluble component includes an insoluble film, and the soluble component includes first and second soluble thermoplastic films on opposite sides of the insoluble film.

9. The method of claim 8, wherein the insoluble film and the first and second soluble thermoplastic films form a tri-component film; and wherein forming the stack includes depositing the tri-component film on the first fiber bed, and placing the second fiber bed on the tri-component film.

10. The method of claim 1, wherein the interlayer includes a veil of filaments of the insoluble component coated with the soluble thermoplastic component.

11. The method of claim 1, wherein the interlayer is patterned to provide a plurality of portions having different levels of resistance to crack propagation, the different portions having at least one of different spatial densities of toughened regions and different compositions for the toughened regions.

12. A method of fabricating a composite laminate, comprising:

forming a stack including first and second fiber beds and an interlayer between the fiber beds, the interlayer including an insoluble thermoplastic component and a soluble thermoplastic component, the soluble thermoplastic component being a coating on the insoluble thermoplastic component, the insoluble component including first and second insoluble films and the soluble component including first and second soluble thermoplastic films, forming the stack including depositing the first insoluble and soluble films on the first fiber bed such that the insoluble film is in contact with the first fiber bed, depositing the second insoluble and soluble films on the second fiber bed such that the second insoluble film is in contact with the second fiber bed, and forming an uncured stack by stacking the first and second fiber beds such that the first and second soluble thermoplastic films are in contact with each other, the first insoluble and soluble films being deposited as a first bi-component film on the first fiber bed, and the second insoluble and soluble films being deposited as a second bi-component film on the second fiber bed, the first bi-component film including through-holes that penetrate through the first insoluble film and the first soluble film, and the second bi-component film including through-holes that penetrate through the second insoluble film and the second soluble film; and impregnating the first and second fiber beds with a resin matrix via the through-holes in the first and second bi-component films prior to forming the uncured stack; and dissolving the soluble thermoplastic component into the resin matrix of the first and second fiber beds to reduce a thickness of the interlayer.

13. The method of claim 12, wherein the thickness of the interlayer is between 2 and 20 microns after dissolving the soluble thermoplastic component.

14. The method of claim 12, wherein the thickness of the interlayer is between 3 and 8 microns after dissolving the soluble thermoplastic component.

15. The method of claim 12, wherein the matrix resin is thermoplastic-starved; and wherein the soluble thermoplastic component is dissolved into the thermoplastic-starved matrix resin.

16. The method of claim 12, wherein the soluble thermoplastic component is mixed with the matrix resin in a region adjacent the insoluble component.

17. The method of claim 12, wherein the insoluble component includes first and second insoluble films, and the soluble thermoplastic component includes first and second soluble thermoplastic films; and wherein forming the stack includes depositing the first insoluble and soluble films on the first fiber bed such that the first insoluble film is in contact with the first fiber bed, depositing the second insoluble and soluble films on the second fiber bed such that the second insoluble film is in contact with the second fiber bed, and forming an uncured stack by stacking the first and second fiber beds such that the first and second soluble thermoplastic films are in contact with each other, wherein the first insoluble and soluble films are deposited as the first bi-component film on the first fiber bed, and the second insoluble and soluble films are deposited as the second bi-component film on the second fiber bed.

18. The method of claim 12, wherein the insoluble component includes an insoluble film, the soluble component includes first and second soluble thermoplastic films on opposite sides of the insoluble film, and the insoluble film and the first and second soluble thermoplastic films form a tri-component film; and wherein forming the stack includes depositing the tri-component film on the first fiber bed, and placing the second fiber bed on the tri-component film.

19. The method of claim 12, wherein the interlayer includes a veil of filaments of the insoluble component coated with the soluble thermoplastic component.

20. The method of claim 12, wherein the interlayer is patterned to provide a plurality of portions having different levels of resistance to crack propagation, the different portions having at least one of different spatial densities of toughened regions and different compositions for the toughened regions.

* * * * *